United States Patent [19]

Schwarzensteiner

[11] Patent Number: 4,737,121
[45] Date of Patent: Apr. 12, 1988

[54] PLUG CONNECTION

[76] Inventor: Hermann Schwarzensteiner, Girletweg 5, D-8445 Windberg, Fed. Rep. of Germany

[21] Appl. No.: 868,646

[22] Filed: May 29, 1986

[30] Foreign Application Priority Data

Jul. 5, 1985 [DE] Fed. Rep. of Germany ....... 3524137

[51] Int. Cl.⁴ .......................................... H01R 13/627
[52] U.S. Cl. .................................................... 439/347
[58] Field of Search ................ 339/91 R, 75 R, 75 M, 339/45 R, 45 M; 285/84, 85, 86, 314, 315, 316; 439/345, 347

[56] References Cited

U.S. PATENT DOCUMENTS

| | | | |
|---|---|---|---|
| 2,939,728 | 6/1960 | Bitel | 285/315 |
| 2,939,729 | 6/1960 | O'Shaughnessy, Jr. | 285/315 |
| 3,285,283 | 11/1966 | Calvin | 285/315 |
| 3,403,930 | 10/1968 | Bernier | 285/315 |
| 4,083,619 | 4/1978 | McCormick et al. | 339/91 R |
| 4,304,452 | 12/1981 | Kiefer | 339/75 M |
| 4,362,348 | 12/1982 | Stephenson et al. | 339/75 M |

FOREIGN PATENT DOCUMENTS 696019 10/1964 Canada ................................. 285/315

Primary Examiner—John McQuade
Attorney, Agent, or Firm—Kane, Dalsimer, Sullivan, Kurucz, Levy, Eisele and Richard

[57] ABSTRACT

The invention provides a separable plug connection comprising a plug member provided with locking wedges and a wedge pusher. That plug connection may constitute a separate part or may be integrated or inserted in units of equipment, machine members etc. The plug connection is radially and axially locked and is non-positively retained and held against rotation. The housing member is provided with axially extending grooves, which receive ribs provided on the outside periphery of the plug member. Resiliently mounted locking members engage actuating forks of the wedge pusher and when the plug member has been forced into the housing snap into and are locked in an annular groove provided at the end of the grooves.

6 Claims, 2 Drawing Sheets

PLUG CONNECTION

This invention relates to a plug connection, particularly for directly connecting units to each other or to hydraulic lines, electric wiring, rotary shafts or the like, comprising a housing and a plug member, which is locked in the housing, wherein said housing and plug member are sealed against each other, e.g., by means of an O ring.

Plug connections of that kind are known per se and serve to connect so-called base bodies, such as valve housings or the like, to compressed air or hydraulic lines, as is the case, e.g., with the plug connection disclosed in Published German Application No. 29 52 468. Pipe joints comprising fittings and union nuts have been disclosed in Published German Application No. 23 62 527. Screwable similar means used as couplings for pressure lines have been disclosed in German Patent Specification No. 31 08 651. Published German Application No. 23 43 811 shows a quick-connecting coupling for hoselines and pipelines, comprising a plug nipple and a receptacle sleeve, which are interfitted and are held together by a U-shaped coupling clamp.

A common feature of said pipe joints resides in that they can be coupled and uncoupled only by a plurality of time-consuming manual operations; besides, they require considerable space and it is not possible to integrate both parts of the plug coupling, i.e., the housing and the plug member, in units of equipment. They cannot be used to connect supply or drain lines of two units which are juxtaposed or superimposed in direct contact with each other. Besides, most of said quick-connecting couplings have an excessive number of parts, which involve a high expenditure even for the assembling.

The invention has been conceived in order to remedy that situation. It is an object of the invention to provide a plug connection by which various units can be connected to each other and to fluid lines, electric wiring, rotary shafts etc. and can be disconnected within short time, without a need for tools, in a simple and quick manner and by means of automated tools used in large-scale production.

This object is accomplished in accordance with the invention in that the plug coupling consists of a housing member, a plug member and a wedge pusher, which is adapted to be interlocked therewith and to push locking wedges, which are radially movable in apertures of a shell of the plug member. The locking wedges each have a rear extension. Extending ribs are provided on the outside surface of the shell of the plug member. Guide grooves are provided in the plug member between webs for actuating forks of the wedge pusher. A slotted snap ring is provided on the wedge pusher and has inwardly facing beads adapted to be received in a mating, i.e., peripheral cooperating, grooves in the webs of the plug member.

A bushing is desirably inserted in the central bore.

The plug member is desirably sealed against the base member by means of sealing rings.

The wedge pusher and the locking wedges suitably desirably consist of plastic.

The housing member desirably consists of plastic.

The plug member desirably consists of plastic.

Various advantages can be afforded by the plug connection proposed by the invention. In the first place the plug connection is axially and radially firmly locked when the plug member has simply been forced into the housing member so that the connection can be used to connect various units of machines, motor vehicles, aircraft etc. The connection can be unlocked and disengaged quickly by a single manual operation. Automatic tools such as are used in large-scale production can readily be used to make and eliminate such connection. In its effective position the plug connection is not only axially and radially locked but is also locked against rotation, as is desirable for numerous applications. The axial lock is effected by means of movable wedges, which are locked and unlocked by a wedge pusher and snap into a peripheral groove of the housing member as the plug member is forced into the housing member. The wedge pusher serves also to lock the entire connection and depending on the field of application can be made in various modifications. A rotation is prevented by means of ribs on the outside of the plug member. The seal between the housing and the plug member is established by means of conventional rubber sealing elements.

The invention will now be explained more in detail with reference to an illustrative embodiment shown on the drawings.

FIG. 1 shows a housing member 1 having a central bore for receiving the plug member 2.

Figure 1:
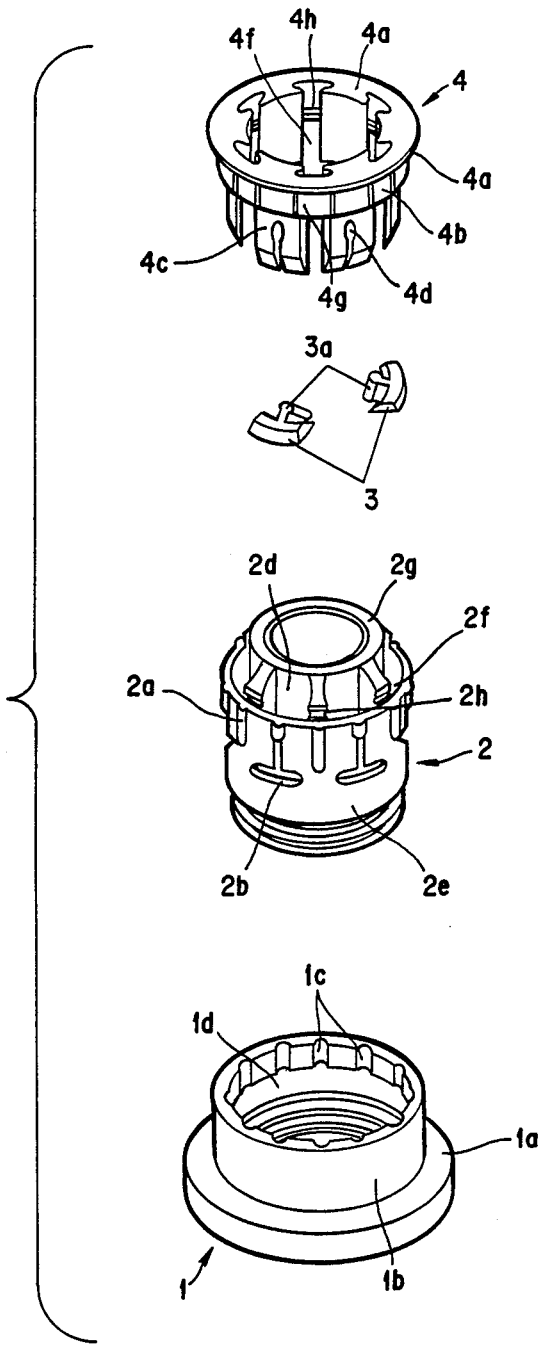
FIG. 1 is an exploded view showing the plug connection.

The housing member 1 consists of a flange 1a and a cylindrical shell 1b, which is formed in its inside surface with grooves 1c, which are open at their top and bottom and serve to receive the ribs 2a, which are provided on the outside of the plug member 2 and prevent rotation thereof. The annular groove 1d serves to receive the locking wedges 3, which move radially outwardly as the wedge pusher 4 is forced toward the housing member 1 because their rear extensions 3a are movably mounted in the recesses 4d of the actuating forks 4c and are thus flanked by the slots 4f.

The plug member 2 consists of a molding 2 having a central bore and is completed by the wedge pusher 4 pushed onto the plug member and by the locking wedges 3. The molding 2 substantially comprises a shell 2e, which has ribs 2a for preventing rotation and slots 2b for movably mounting the radially movable locking wedges 3. The shell 2e is connected to the tubular inner carrier 2g by webs 2f formed with a peripheral groove 2h. Inward of the slots 2b, the carrier 2g is formed adjacent to the guide grooves 2d with further apertures 2c for receiving the rear extensions 3a of the locking wedges 3 in their effective position.

The wedge pusher 4 has a top rim 4a and under said rim 4a has a slotted snap ring 4b. The latter has a circular series of depending staggered resilient extensions, which constitute actuating forks 4c for actuating the locking wedges 3, the rear extensions 3a of which enter the slot 4d and are urged radially outwardly by the wedge-shaped surfaces 4e. The snap ring 4b has sections 4g having inwardly facing beads 4h. Sections 4g are biased inwardly.

When the locking wedges 3 have been inserted into the slots 2b and the wedge pusher 4 has been inserted into the molding 2, the wedge pusher 4 has been firmly interconnected to the molding 2 to provide the plug member proper 2. That unit consisting of the plug member 2 is then inserted into the housing member 1. A bushing 5 can be inserted into the central bore of the plug member 2. The plug member 2 is sealed against the base member 2 by means of sealing rings 6. In the effective position, when the plug member 2 has been forced into the housing member 1, the locking wedges 3 snap into the annular groove 1d adjacent and perpendicular to the grooves 1c and the inwardly facing beads 4h of sections 4g "snap" into grooves 2h against the bias of sections 4g. As is apparent from FIGS. 2 and 3 the locking wedges 3 are prevented from springing back. They can be moved out of their effective position only by a pull on the plug member 2 (wedge pusher 4).

Figure 2:
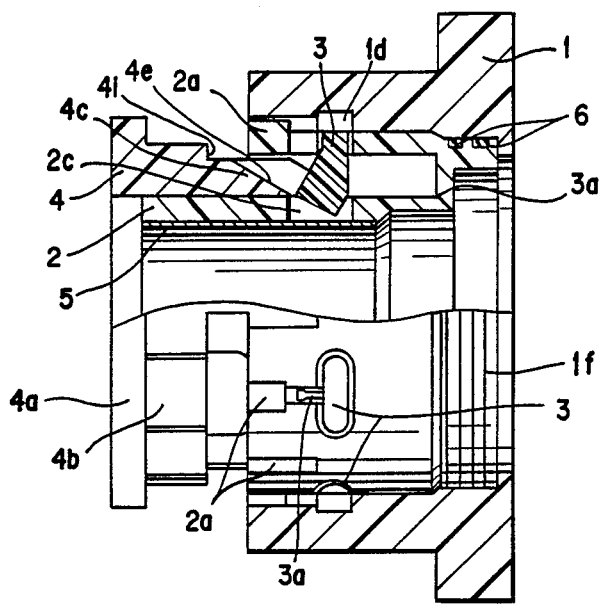
FIG. 2 is a fragmentary sectional view showing the unlocked connection.
Figure 3:
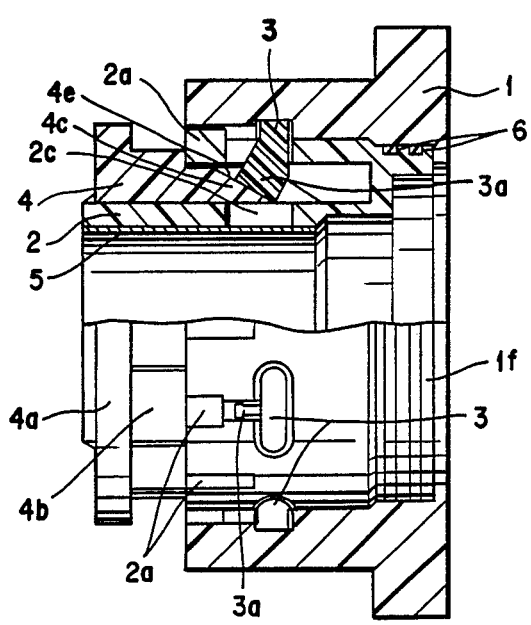
FIG. 3 is a fragmentary sectional view like FIG. 2 but shows the connection in its effective position.

FIG. 2 shows the plug member 2 before it is forced to its effective position in the housing member; that effective position is shown in FIG. 3.

When the plug member 2 has been forced into the housing member, the locking members 3 are forced outwardly into the grooves 1d of the housing member 1 and snap into said grooves. For this purpose the locking wedges 3 are urged by respective wedge-shaped surfaces 4e of respective actuating forks 4c provided on the wedge pusher 4 on the outside periphery of the plug member. The step 41 of the slotted snap ring 4b serves as a stop and indicates that the effective position shown in FIG. 3 has been reached.

By a pull on the rim 4a of the wedge pusher 4 the wedge-shaped surface 4e is moved outwardly so that the locking wedges 3 are released to return to their position of rest in the apertures 2b whereas their rear extensions 3a enter the slots 2c. The entire plug member 2 can be pulled out of the housing member 1.

Instead of being provided with the illustrated members 1a and 2d, respectively, the housing member 1 and the plug member 2 may be integrated in the units to be connected. For instance, the plug member may be connected to a water pump, which is not shown on the drawings, and which may be connected to the housing member 1 in a simple manner, simply in that the plug member is forced into the housing member, which may be integrated in a motor block, which is not shown too, the parts may be separated merely by a pulling operation. The plug member 2 cannot spontaneously separate from the housing member 1.

It will be understood that the housing member 1 and the plug member 2 may constitute components of other units, machine members, rotary shafts, cable end pieces etc. and that the connection may be used as a separate connector or adapter.

I claim:

1. A quickly disconnecting plug coupling comprising:
   a female member comprising a tubular section defining a bore and having an annular radially inwardly facing groove and axially extending grooves therein, and
   a male member being slidable within said bore, to be locked sealingly within said bore, said male member comprising:
   (i) a plug member having a shell comprising apertures and having axially extending ribs on the outer surface thereof,
   (ii) locking wedges each having a rear projection and being radially movable within said apertures, and
   (iii) an axially movable wedge pusher adapted to be interlocked with said plug member and to move said locking wedges radially within said apertures, the wedge pusher having axially extending actuating members each having a partially axially extending groove which receives the rear projection of a locking wedge and each having an inwardly beveled surface,
   wherein said plug member has webs and guide grooves between said webs to accept said actuating members, the wedge pusher has a slotted snap ring having biased sections having inwardly facing beads, and the webs have peripheral cooperating grooves, such that when said wedge pusher is pushed in an axial direction toward said female member the beveled surfaces of the actuating members cause the locking wedges to move radially outwardly into the annular radially inwardly facing groove of said female member, the inwardly facing beads of said snap ring sections are received in said peripheral cooperating grooves of said webs, and the axially extending grooves in said female member receive the axially extending ribs from said plug member to prevent rotation thereof.

2. The plug coupling of claim 1, wherein the plug member has a bushing inserted therein.

3. The plug coupling of claim 1, wherein the female member is sealed against the male member by sealing rings.

4. The plug coupling of claim 1, wherein the wedge pusher and the locking wedges consist of plastic material.

5. The plug coupling of claim 1, wherein the female member consists of plastic material.

6. The plug coupling of claim 1, wherein the plug member consists of plastic material.

* * * * *